United States Patent
Seifert et al.

(10) Patent No.: US 7,537,278 B2
(45) Date of Patent: May 26, 2009

(54) GUIDING DEVICE FOR A MOVING ROOF ELEMENT OF VEHICLE ROOF THAT CAN BE OPENED

(75) Inventors: Wolfgang Seifert, Wielenbach (DE); Johann Pihale, Oberbrunn (DE); Dominik Hoelzel, Groebenzell (DE); Andreas Sedlmeir, Utting (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/573,249

(22) PCT Filed: Jul. 28, 2005

(86) PCT No.: PCT/DE2005/001342

§ 371 (c)(1),
(2), (4) Date: Sep. 5, 2007

(87) PCT Pub. No.: WO2006/012868

PCT Pub. Date: Feb. 9, 2006

(65) Prior Publication Data

US 2008/0001441 A1     Jan. 3, 2008

(30) Foreign Application Priority Data

Aug. 3, 2004    (DE) .................. 10 2004 037 797

(51) Int. Cl.
*B60J 7/057* (2006.01)

(52) U.S. Cl. ................... 296/223; 296/216.08

(58) Field of Classification Search .......... 296/216.08, 296/223
See application file for complete search history.

(56) References Cited

U.S. PATENT DOCUMENTS

| 4,984,332 | A | 1/1991 | Bienert et al. |
| 6,164,718 | A | 12/2000 | Stallfort |
| 6,325,453 | B1 | 12/2001 | Manders |
| 6,890,025 | B2 | 5/2005 | Hanke |

FOREIGN PATENT DOCUMENTS

DE     10003377 A1    8/2001

*Primary Examiner*—Dennis H Pedder
(74) *Attorney, Agent, or Firm*—David S. Safran; Roberts Mlotkowski Safran & Cole, P.C.

(57) ABSTRACT

A guide device for a movable roof element of an openable vehicle roof with a guide sliding block connected to the roof element and with a guide unit which has two guide surfaces which route the guide sliding block between themselves and which are pointed in opposite directions, one of the guide surfaces being held on the guide unit to be able to move relative to the guide sliding block and being pretensioned relative to the other guide surface by a spring mechanism, the spring mechanism having at least two spring elements which are located in a parallel connection on the guide unit. Preferably, the component which contains the slide surface is supported by the first spring element on the first support site of the guide unit and by the second spring element on the second support site of the guide unit.

9 Claims, 8 Drawing Sheets

GUIDING DEVICE FOR A MOVING ROOF ELEMENT OF VEHICLE ROOF THAT CAN BE OPENED

BACKGROUND OF THE INVENTION

1. Field of the Invention

The invention relates to a guide device for the movable roof element of an openable vehicle roof with a guide sliding block connected to the roof element and with a guide unit which has two guide surfaces which route the guide sliding block between themselves and which face in opposite directions, one of the guide surfaces being held on the guide unit to be able to move relative to the guide sliding block and being pretensioned relative to the other guide surface by a spring means.

2. Description of Related Art

With a guide device of the type indicated above, the roof element can be raised and lowered again by relative lengthwise movement of the guide unit along the guide sliding block.

German Patent DE 101 44 756 C2 and corresponding U.S. Pat. No. 6,890,025 B2 discloses a generic guide device in which a slide element of a guide unit or guide claw is pressed against a sliding block path with spring-elastic pretensioning and an opposite surface of the guide claw adjoins the opposite side of the sliding block path. The spring-elastic pretensioning is provided by a single elastomeric spring element which is surrounded by the bush-shaped slide element. With consideration of the existing installation space, the support surface of this spring element is too small for the cover of an openable vehicle roof which has a large mass and which is to be guided by the guide device in order to be able to prevent rattling of the guide device over an uneven roadway surface with sufficient elasticity of support.

European Patent EP 1 070 614 A1 and corresponding to U.S. Pat. No. 6,325,453 B1 discloses a guide device in which the guide claw has a guide recess in which a guide bridge is movably held. In the guide claw, there is an elastic element in the form of a spring which forms the lower guide surface for the guide bridge and it has convex section which presses against the guide bridge so that play between the guide claw and the guide bridge is compensated. The spring is in sliding contact with the guide bridge. In order to be able to carry out its support function, it must press with distinct force against the guide bridge, by which friction is increased. The elastic behavior of such a spring is inadequate.

SUMMARY OF THE INVENTION

A primary object of the present invention is to devise a guide device of the the initially mentioned type which is improved with respect to the spring-elastic support.

This object is achieved in accordance with the invention in the aforementioned guide device in that the spring means has at least two spring elements which are located in a parallel connection on the guide means.

By using at least two spring elements which are connected in parallel and which can also be spring sections of a common spring part, the spring means is reinforced, especially with respect to the available installation space, smaller deformation of the especially elastomeric spring elements being ensured at still high spring support force. By adding the spring characteristics of at least two spring elements in the parallel connection, a steeper overall spring characteristic can be set which cannot be implemented by individual springs to this extent with little effort.

In the preferred configuration, the component which contains the slide surface is supported by the first spring element on the first support site of the guide unit and by the second spring element on the second support site of the guide unit. Favorable arrangements of the two spring elements can be selected. Any other spring element can support the component which contains the slide surface both on the first support site as well as on the second or another support site.

According to another preferred configuration, the second spring element forms the component which contains the slide surface or it bears the slide surface and is supported by the first spring element on the first support point of the guide unit, it being supported itself at the second support site of the guide unit.

Advantageously, the first support site is a fixed axis or a fixed pin of the guide unit and the second support site is a carriage which bears the guide part or a support part which is attached to the guide unit or the carriage.

The first spring element can be a plastic or metal spring of any shape. Preferably, it is an especially ring-shaped elastomeric part.

The second spring element can likewise be an elastomeric part or also a spring and especially a leaf spring.

Basically, for an elastomeric part, there is the possibility of largely any shape of the spring element, especially with respect to the limited space conditions for the guide unit.

According to a preferred configuration, the leaf spring is attached to the second support site by means of its two spring ends which face opposite one another and their elastic middle part is connected to the component which bears the slide surface or it forms the slide surface itself. A leaf spring attached in this way offers high spring support force vertically to the second support site and a sufficient support and compensation capacity parallel to the second support site.

Another configuration calls for the first spring element and the second spring element or any other spring element to be material sections of a common elastomeric part. In this connection, the two spring elements can have the same or different spring properties.

Advantageously, the guide unit or the carriage can be moved along a roof-mounted guide rail so that the guide unit can be moved along the sliding block path and can cause a lifting and lowering motion of the cover based on the course of the sliding block path.

Embodiments of the invention are explained in detail below with reference to the accompanying drawings.

DETAILED DESCRIPTION OF THE INVENTION

Figure 1:
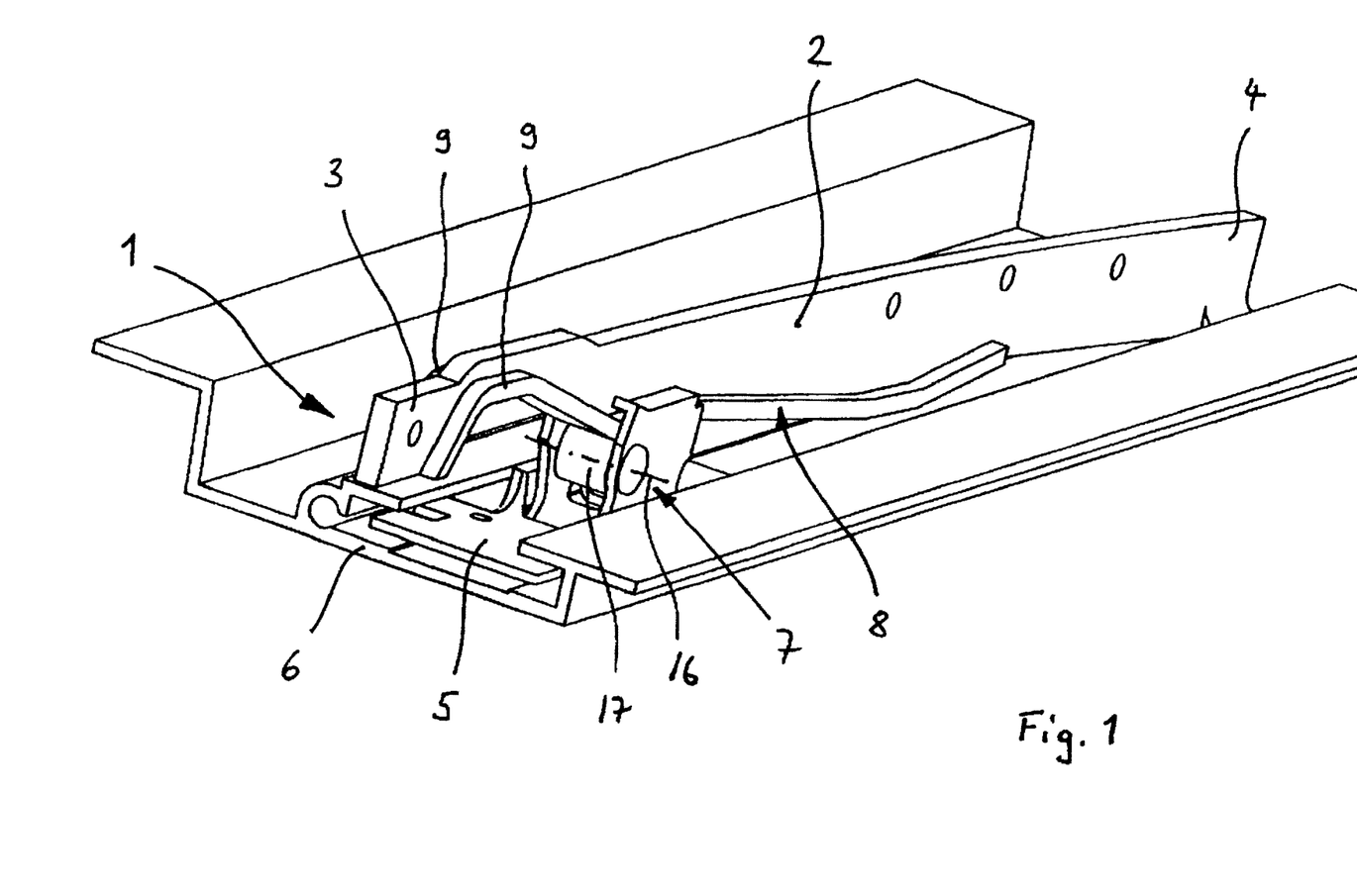
FIG. 1 is a perspective top view of a guide device with a carrier element for a movable roof element and a guide unit for the carrier element which is shown in simplified form.

A guide device 1 (see FIG. 1) for a movable roof element such as, for example, a cover (not shown) of an openable vehicle roof has a carrier element 2 which is permanently mounted on the bottom of the cover. The cover of the openable vehicle roof which is, for example, a sliding roof, a sliding and lifting roof or a spoiler roof, is adjustable in the known manner between a closed position and an open position for clearing a roof opening of the vehicle roof. By raising the back end 3 of the carrier element 2 relative to its front end 4, the cover can be moved into the pivoting or ventilation position with the back edge raised.

The guide device 1 has a carriage 5 which is held on a roof-mounted guide rail 6 to be able to move along the carrier element 2 and is movable, for example, via a compressively stiff drive cable. The carriage 5 contains a guide unit 7 (shown schematically in FIG. 1) which engages the sliding block path 8 of the carrier element 2. The sliding block path 8 is formed as a guide bridge which is T-shaped in cross section and is located on the lower edge of the carrier element 2 (see also FIG. 2) such that on either side of the carrier element 2 a respective sliding block section 9 of the guide bridge or sliding block path 8 projects laterally.

Figure 2:
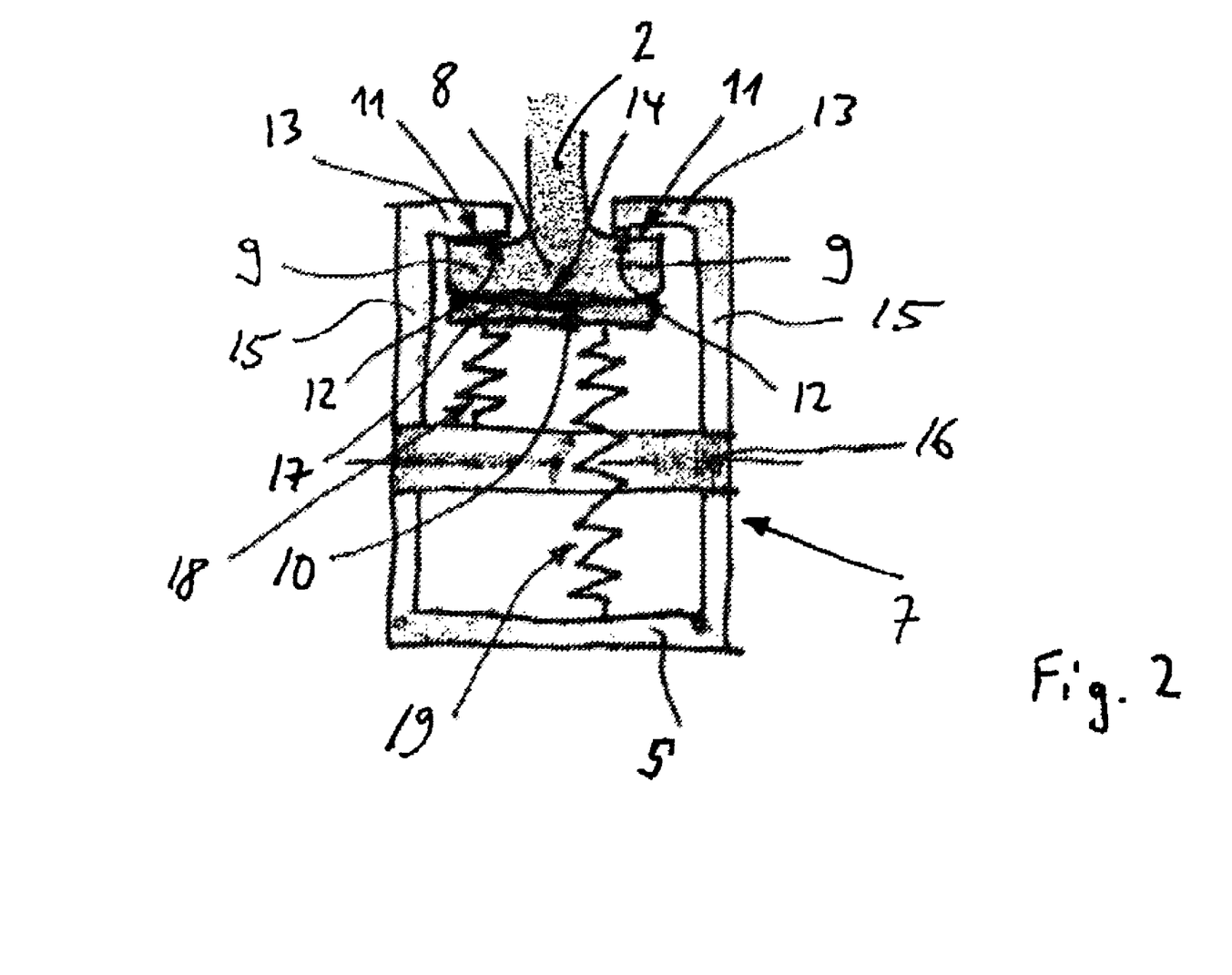
FIG. 2 is a schematic sectional view of the guide unit with the sliding block path of the carrier element.

The sliding block path 8 contains a lower contact surface 10 on its bottom and an upper contact surface 11 on the top of each laterally projecting sliding block section 9. The slide surface 12 of the respective enclosure 13 of the guide unit 7 of the carriage 5 adjoins each upper contact surface 11. The slide surface 14 of the guide unit 7 of the carriage 5 adjoins the lower contact surface 10 and is held with pretensioning under the lower contact surface 10 of the sliding block path 8 so that the sliding block path 8 or the two sliding block sections 9 are held and guided in the vertical direction without play on the guide unit 7.

The guide unit 7 of the carriage 5 contains two opposite side walls 15 with flanges 13 which are located on their upper ends and which are arranged at a right angle relative to the side walls 15 and face inwardly toward one another. On a fixed axis 16 which connects the two side walls 15 permanently to one another and which is formed, for example, by a pin, a slide roll or slide bush 17 is permanently attached with interposition of a first ring-shaped elastomeric spring element 18 (shown schematically in FIG. 2, see also FIG. 3). The slide bush 17 is pressed by means of the first spring element 18 with pretensioning against the bottom or the lower contact surface 10 of the sliding block path 8. The pretensioning force of the first spring element 18 presses the two flanges 13 against the upper contact surfaces 11 via the axis 16 and side walls 15 so that the sliding block path 8 is held without play between the flanges 13 and the slide bush 17.

The sliding block path 8 runs along the carrier element 2 in the vertical or Z-direction at a different level. If the carriage 5 with the guide unit 7 is pushed in the lengthwise direction relative to the carrier element 2, thus a raising or pivoting motion of the carrier element 2 and thus of the cover attached to it takes place.

The carrier element 2 can be made, for example, as a sheet metal part, and the sliding block path 8 can be spray-jacketed, for example, with POM (polyoxymethylene; acetal). The entire carrier element 2, however, can also be made of a plastic, such as POM, for example.

This previously described configuration of the guide device is known from German Patent DE 101 44 756 C2 and corresponding U.S. Pat. No. 6,890,025 B2, the later being incorporated by reference, to the extent necessary, for further explanation.

Different embodiments of the guide unit 7 of the carriage 5 in accordance with the invention are described below. They are based on the schematic of FIG. 2, according to which the slide surface 14, or the slide bush 17 which forms the slide surface 14, or in general, the component which forms the slide surface 14, is supported relative to the carriage 5 or the guide unit 7 by a second spring element 19. The two spring elements 18, 19 are connected in parallel according to this configuration.

Figure 3:
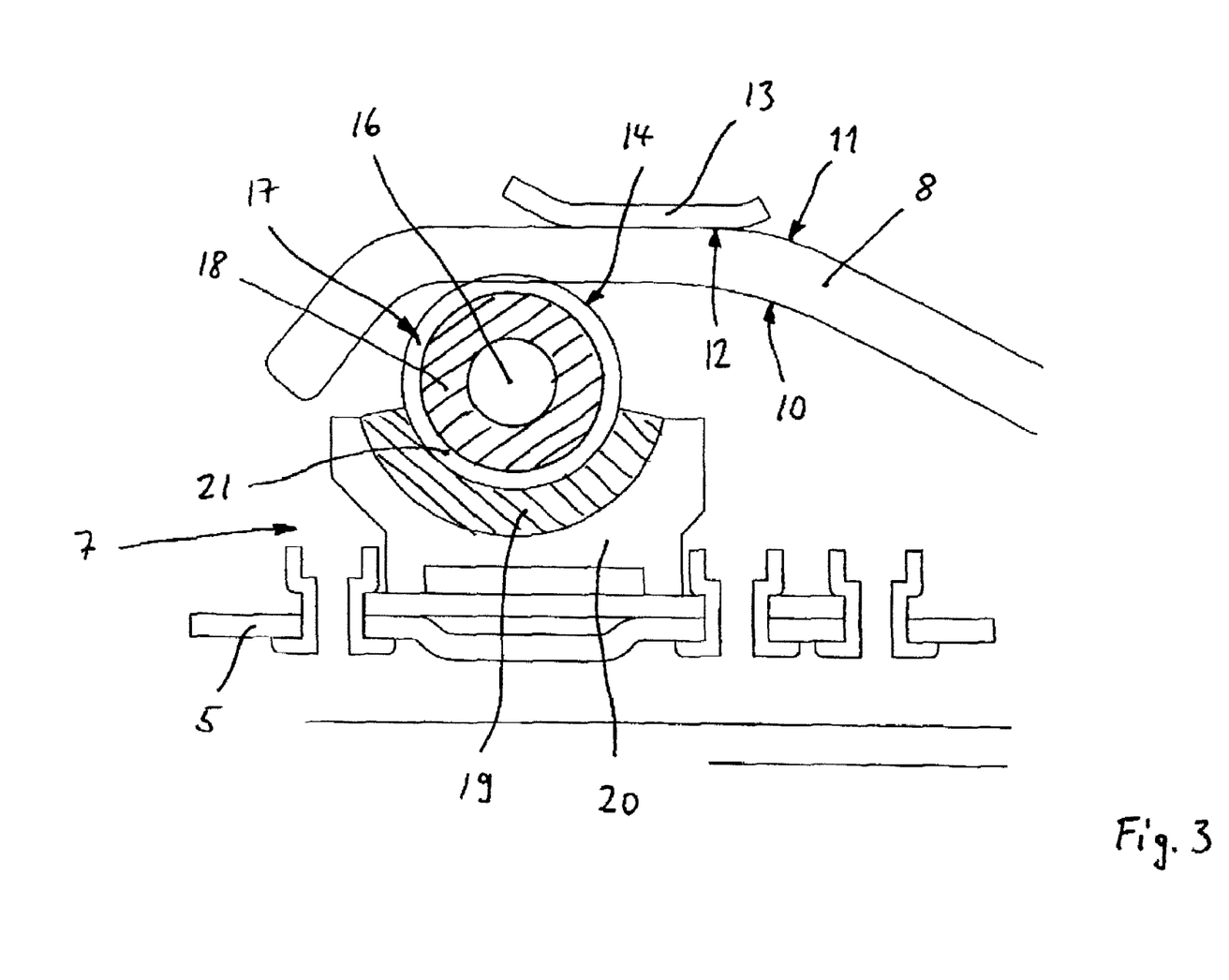
FIG. 3 is a sectional view of a first embodiment of the guide unit.

In the first embodiment shown in FIG. 3, the slide bush 17 according to the description above is supported by the first spring element 18 on the axis 16, and thus, on the guide unit 7. The slide bush 17 is also supported relative to the carriage 5 or the guide unit 7 by means of the second spring element 19 which is formed from elastomeric material and is attached on the bottom to a support 20 that is attached to the carriage 5 and on the top to the bottom section 21 of the slide bush 17. The second spring element 19, as shown in FIG. 3, has the shape of a circular ring section and extends with a constant radial thickness, for example, over roughly 150° to 160° with respect to the axis 16. This less than semicircular configuration of the second spring element 19 precludes collision of the second spring element 19 and its support 20 with the sliding block path 8 when the carriage 5 is moved lengthwise with respect to the curvature of the sliding block path 8.

The slide bush 17 is thus supported by the two spring elements 18, 19, which are located in a parallel connection relative to the carriage 5 and the guide unit 7. Loading directed down from the cover via the sliding block path 8 presses the slide bush 17 at the same time against the force of the two spring elements 18, 19. Based on its configuration which is symmetrical to the axis 16, the first spring element 18 uniformly supports the slide bush 17 both in the vertical direction and also in the lengthwise direction, while the second spring element 19 due to its configuration offers auxiliary support which acts preferably in the vertical direction and to a lesser extent in the lengthwise direction. Thus, tolerance compensation is effected between the slide surface 14 and the enclosure 13 and the sliding block path 8 which is held in between.

By dividing the spring forces acting on the support or the slide bush 17 over a larger elastomeric volume which has been made available by the two spring elements 18, 19, in the given installation space, the stresses initiated by the force of the weight of the cover via the sliding block path 8 can be reduced in each of the two spring elements 18, 19. In this way, better durability of the elastomeric material of the two spring elements 18, 19, is enabled.

The spring constants or spring characteristics of the two spring elements 18, 19 can be the same or different. By adding the two spring characteristics in a parallel connection, a steeper overall characteristic can be set with which the desired spring behavior can be achieved. Overly soft spring behavior which allows rattling of the guide device when the cover vibrates can likewise be precluded, like overly hard spring behavior in which a high expenditure of force for moving the carriage 5 would be necessary due to high friction between the sliding block path 8 and the slide bush 17 as well as the enclosure 13, and thus, stiffness of the guide unit 7 would be present.

A second embodiment (see FIG. 4) likewise contains a ring-shaped first elastomeric spring element 18 mounted on the axis 16. A fixed, nondeformable (rigid) guide part 22 extends surrounds the first spring element 18. The upper slide section 23 of the guide part 22 adjoins the sliding block path 8, being formed as a part of a slide bush. A second elastomeric spring element 24 is made, for example, in the form of a plate, is attached to the carriage 5 and is connected integrally to the first spring element 18 via a material bridge 25. The fixed guide part 22 extends with its bottom section 26 over the length of the second spring element 24 and is permanently connected to the top of the second spring element 24 and the material bridge 25. Due to the beveled front and back sides 27, 28 of the fixed guide part 22, the guide unit 7 can also follow the curve of the sliding block path 8 in sliding contact of the upper slide section 23.

Figure 4:
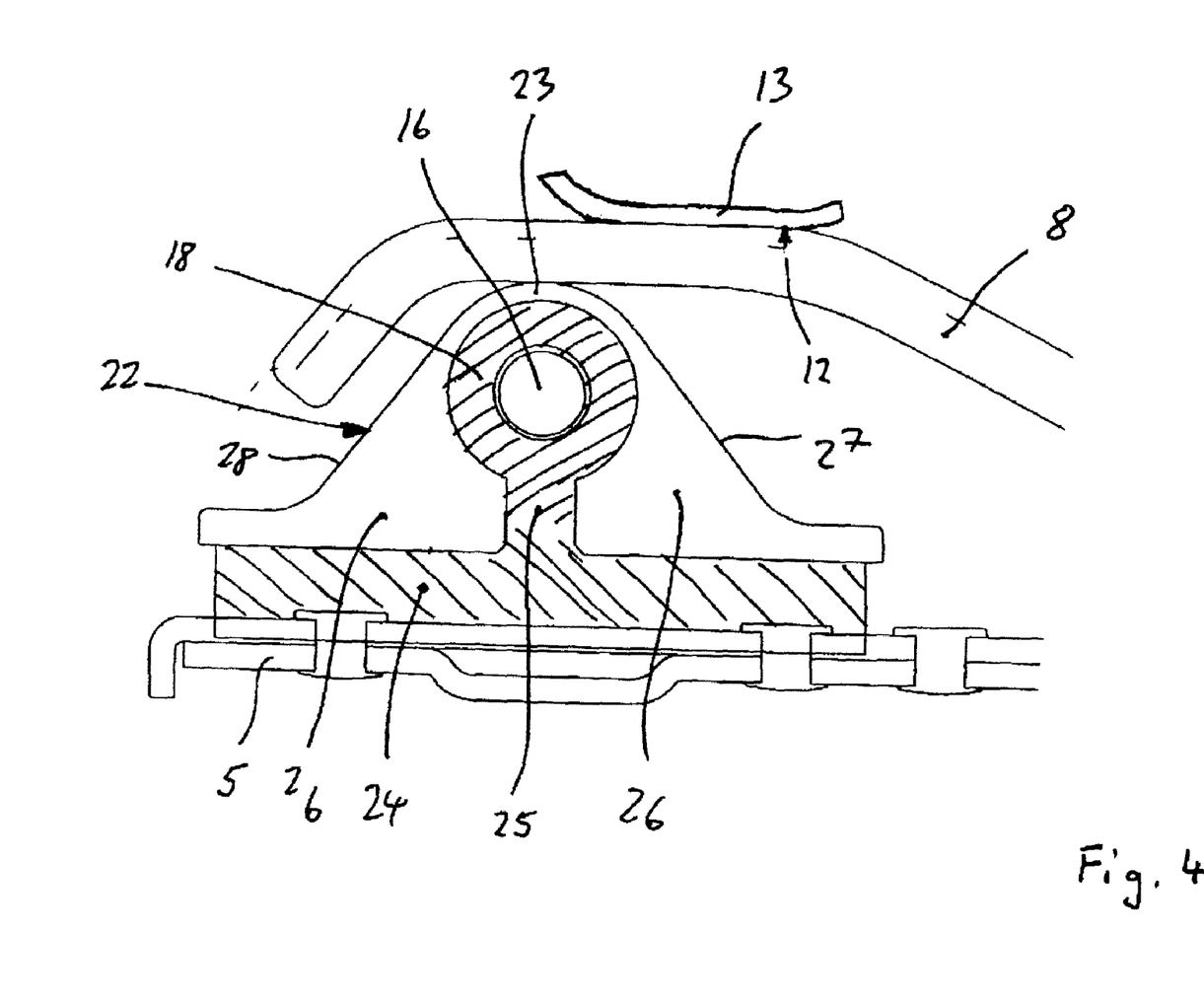
FIG. 4 is a sectional view of a second embodiment of the guide unit.

The two spring elements or spring regions 18, 24 are connected to one another, but constitute essentially independently acting spring elements. Accordingly, the two spring elements or spring regions 18, 24 could also be formed without the connecting material bridge 25. In this embodiment, high vertical loading can be accommodated by the two elastomeric spring elements 18, 24, also shear forces being supported in the x or lengthwise direction. Here, the two spring elements or spring regions 18, 24 can have the same or different spring constants. By moving the elastomeric spring element 24 away from the slide surface 14 on the carriage 5, the elastomeric spring element 24 can be made larger, so that even for a high required support force, only small deformation of the elastomeric material results, so that damage to it by excess compression can be precluded.

Figure 5:
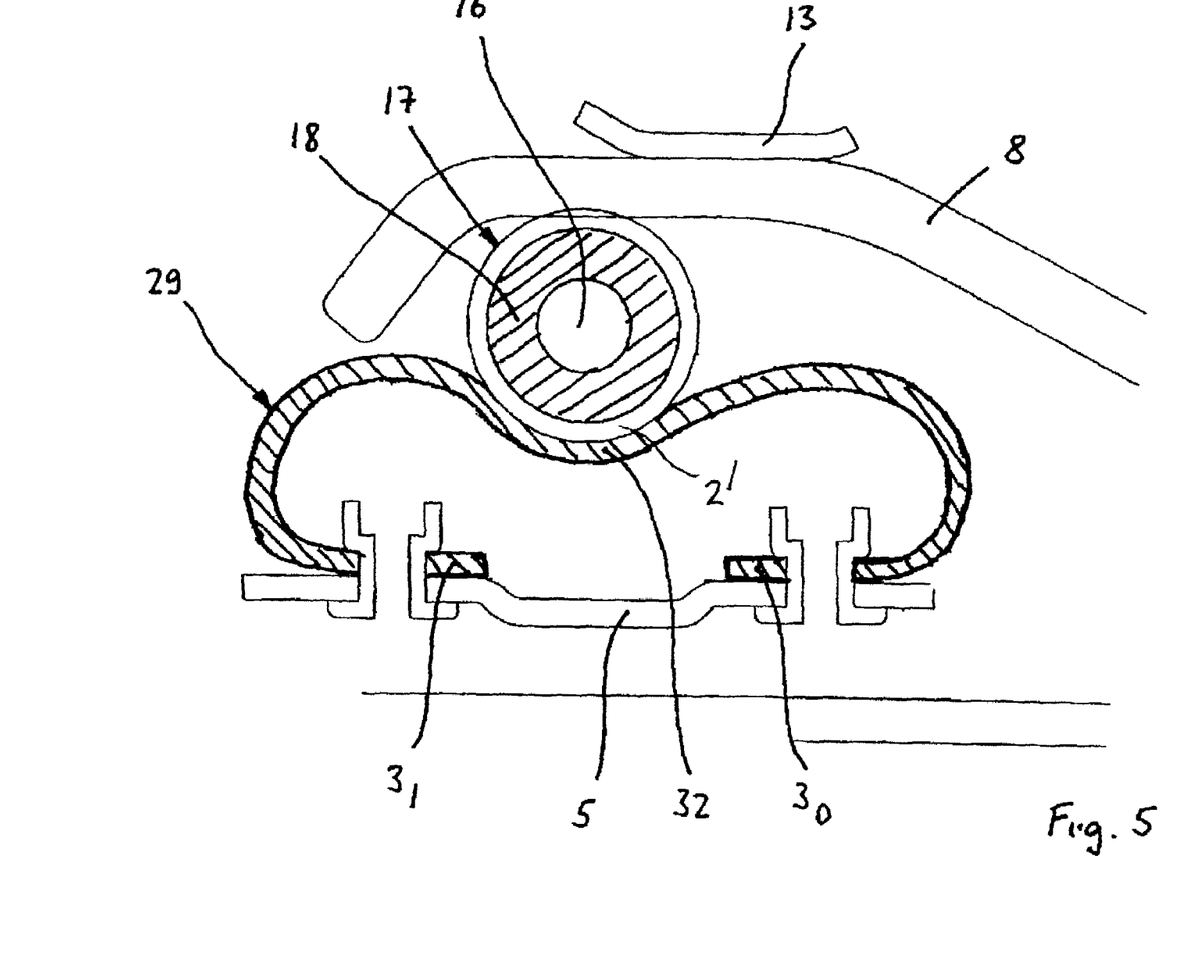
FIG. 5 is a sectional view of a third embodiment of the guide unit.

According to a third embodiment (see FIG. 5), the slide bush 17 is permanently attached to the axis 16 by means of the first spring element 18 according to the first embodiment (FIG. 3). A second spring element 29, which is formed in the manner of a leaf spring, is attached to the carriage 5 at its two, oppositely directed ends 30, 31. The elastic middle part 32 of the second spring element 29 has an arch which bulges down and which is matched to the shape of the slide bush 17. The second spring element 29 is permanently attached to the bottom section 21 of the slide bush 17 with the arch of the elastic middle part 32 and presses the slide bush 17 with spring pretensioning up against the sliding block path 8. The manner of action of the two spring elements 18, 29 corresponds fundamentally to that of the first embodiment, the leaf spring with a corresponding design enabling greater equalization motion and thus greater tolerance equalization especially in the lengthwise direction.

Figure 6:
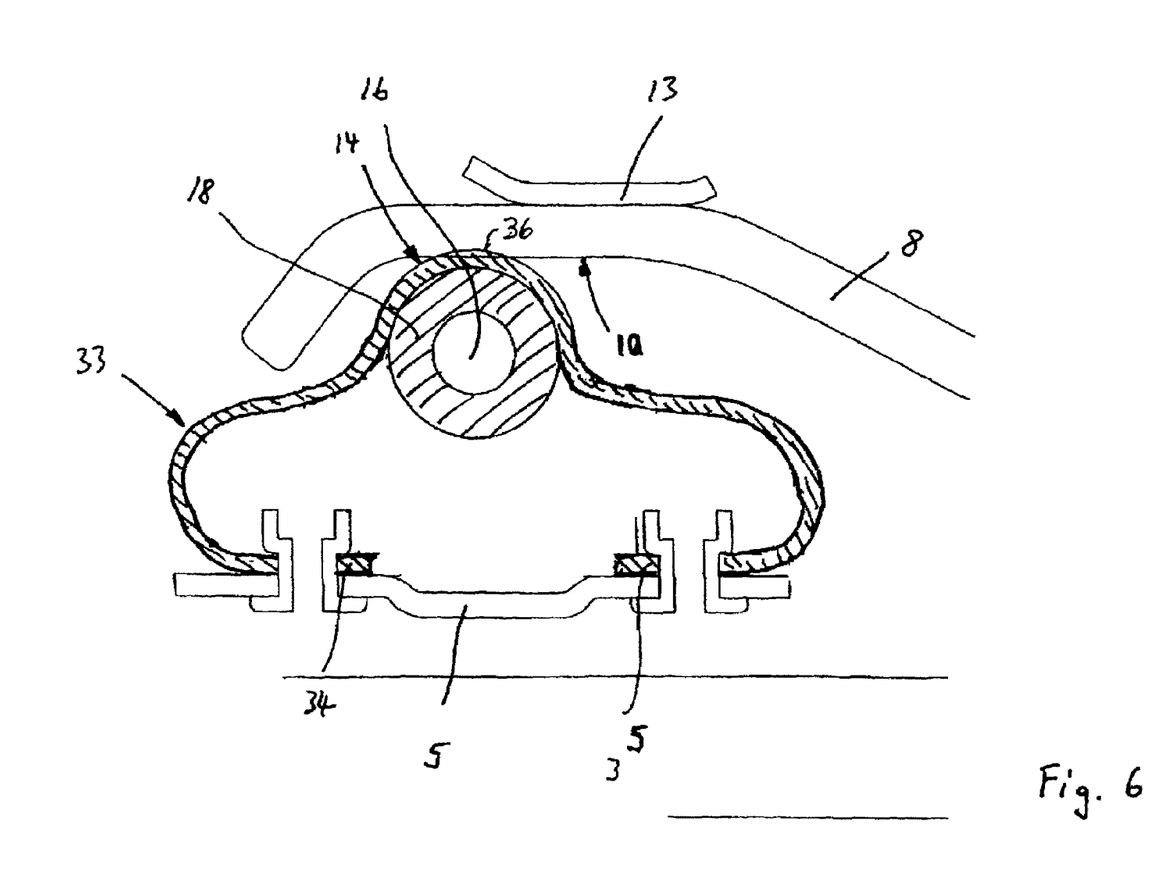
FIG. 6 is a sectional view of a fourth embodiment of the guide unit.

The fourth embodiment (see FIG. 6) as a modification of the third embodiment, likewise, has a first ring-shaped elastomeric spring element 18 which surrounds the axis 16 and is permanently attached to it. The second spring element 33 which is likewise formed in the manner of a leaf spring with its two oppositely directed ends 34, 35 attached to the carriage 5 and an elastic middle part 36 which contains an arch which bulges up and which is matched to the cylindrical shape of the first spring element 18. The second spring element 29 is attached with the arch of the elastic middle part 32 to the top half of the first spring element 18 and is pressed up against the sliding block path 8 as a result of spring pretensioning. The second spring element 29 on its middle part 36 forms the slide surface 14 which is in sliding contact with the slide surface 12 of the sliding block path 8. The slide bush 17 can be eliminated by this simple structure.

The leaf springs of the two preceding embodiments can also be attached differently. Thus, the two spring ends can also be attached to the carriage in an alignment parallel to one another, such that the leaf spring is arranged essentially in a U-shape. Furthermore, the spring ends 30, 31 or 34, 35, in contrast to FIGS. 5 & 6, could also face away from each other, and this version would require more space for the leaf spring.

Figure 7:
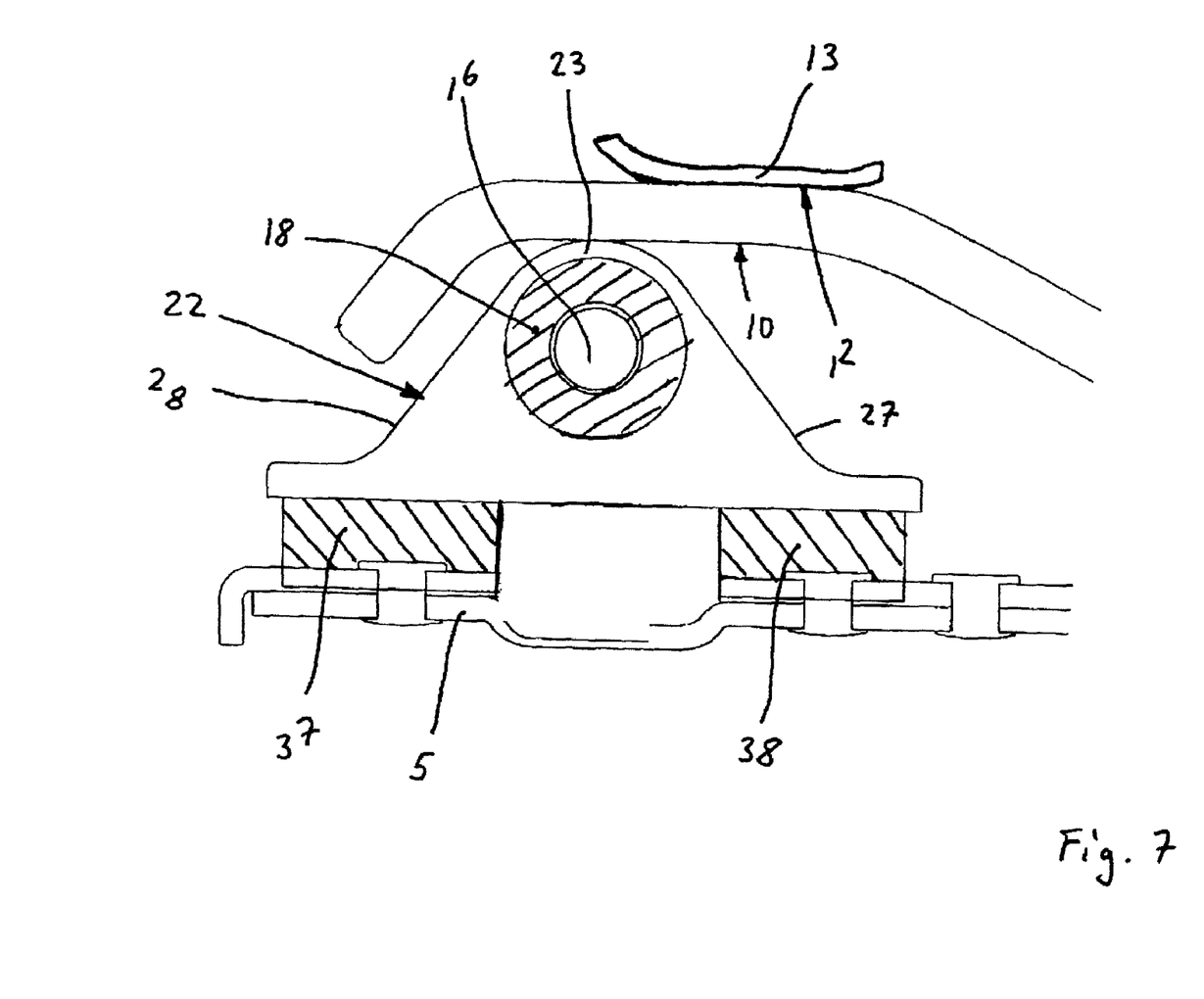
FIG. 7 is a sectional view of a fifth embodiment of the guide unit.

A fifth embodiment (see FIG. 7) is a modification of the second embodiment (FIG. 4) and likewise contains the first ring-shaped elastomeric spring element 18 which is attached to the axis 16 and which is completely surrounded by the fixed, nondeformable guide part 22. Instead of the second elastomeric spring element 24, the guide unit 7 contains a second and a third elastomeric spring element 37, 38 in a parallel connection as elastomeric blocks which are spaced apart from one another. The spring elements 37, 38, support the guide part 22 on the bottom on the carriage 5 and are permanently connected to the two parts. The second and third elastomeric spring element 37, 38 can have the same or different spring properties.

Figure 8:
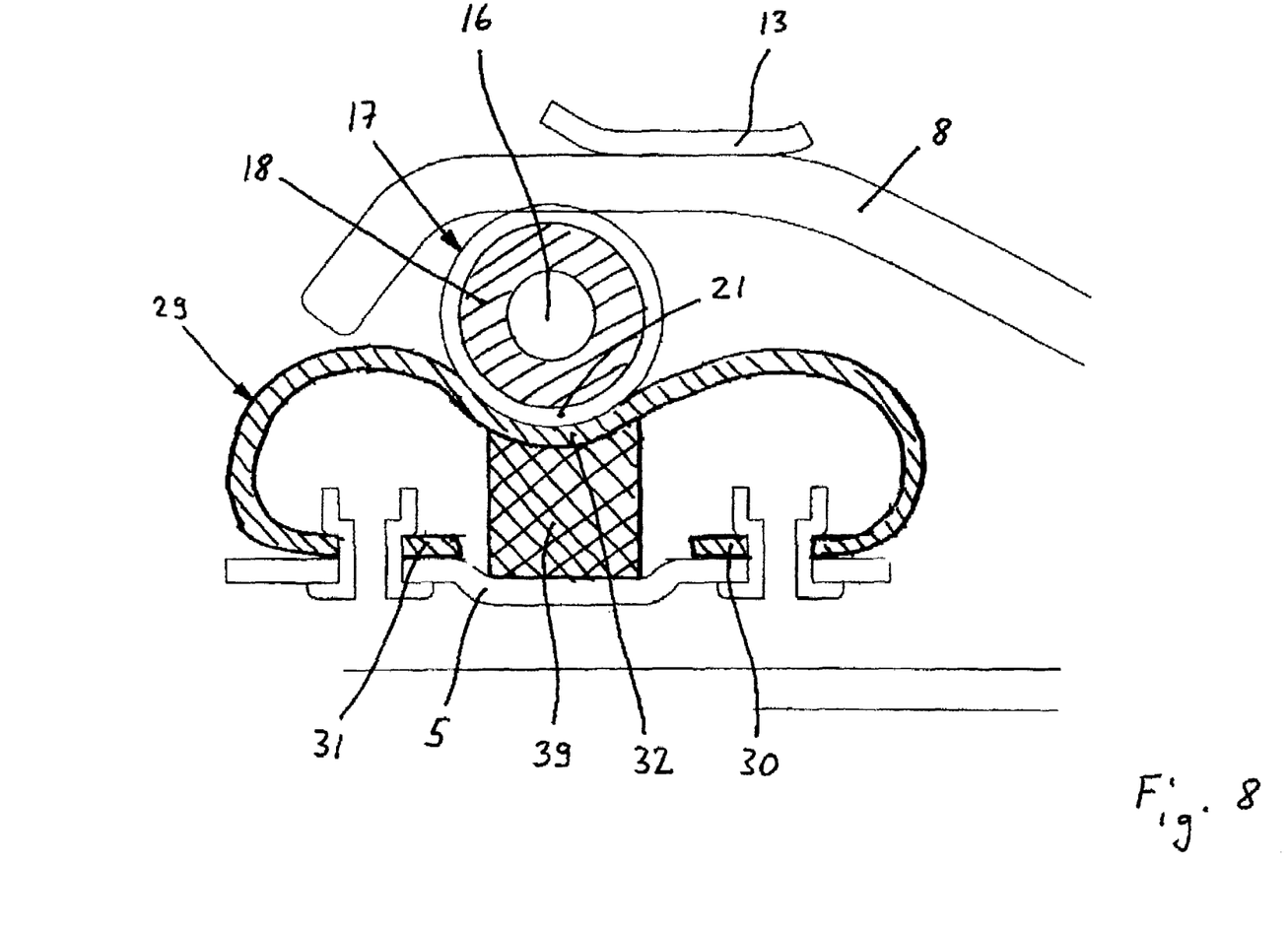
FIG. 8 is a sectional view of a sixth embodiment of the guide unit.

According to the sixth embodiment (see FIG. 8), which is a modification of the third embodiment (FIG. 5), the slide bush 17 is likewise permanently mounted on the axis 16 by means of a first spring element 18. In addition to the second spring element 29, which is formed in the manner of a leaf spring, there is a third spring element 39 which is located between the arch of the elastic middle part 32 on the bottom section 21 of the slide bush 17 and the carriage 5 or another fixed part of the guide unit 7 and is permanently connected to at least one of these parts. Here, the desired overall spring behavior can also be set by the corresponding choice of spring properties of the individual spring elements.

Furthermore, in all embodiments, additional spring elements can support the slide surface 14 and the component 17 which bears the slide surface on the carriage 5 or another fixed part of the guide unit 7.

In all embodiments, the guide bridge or guide sliding block 8 is not limited to the described T-shaped cross sectional shape, but can also have a L-shaped cross-sectional shape with only one lateral sliding block section 9, for example.

What is claimed is:

1. Guide device for a movable roof element of an openable vehicle roof, comprising:
    a guide sliding block for connection to the roof element, said guide sliding block having upper and lower sliding contact surfaces,
    a guide unit which has two guide portions between which the guide sliding block is routed and which face in opposite directions, each of the guide portions having a slide surface along which the guide sliding block is movable, and
    spring means for pretensioning the guide sliding block against the slide surfaces,
    wherein the spring means comprises at least two spring elements which are connected in the guide unit such that the spring characteristics of the at least two spring elements connected are added to provide the spring means with a steeper overall spring characteristic than that of the individual springs,
    wherein the lower sliding contact surface of the guide sliding block is supported by the first spring element of said at least two spring elements on a first support site of the guide unit and by at least the second spring element of said at least two spring elements on a second support site of the guide unit, and
    wherein the second spring element forms the lower slide surface and is supported by the first spring element on the first support site of the guide unit and is supported itself at the second support site of the guide unit.

2. Guide device as claimed in claim 1, wherein a third spring element of said at least two spring elements is supported on a third support site of the guide unit.

3. Guide device as claimed in claim 1, wherein the first support site is a fixed axis of the guide unit and the second support site is a carriage which bears the guide unit or a support part which is attached to the carriage.

4. Guide device for a movable roof element of an openable vehicle roof, comprising:

a guide sliding block for connection to the roof element, said guide sliding block having upper and lower sliding contact surfaces, a guide unit which has two guide portions between which the guide sliding block is routed and which face in opposite directions, each of the guide portions having a slide surface along which the guide sliding block is movable, and spring means for pretensioning the guide sliding block against the slide surfaces.

wherein the spring means comprises at least two spring elements which are connected in the guide unit such that the spring characteristics of the at least two spring elements connected are added to provide the spring means with a steeper overall spring characteristic than that of the individual springs, wherein the first spring element is a ring-shaped elastomeric part.

5. Guide device as claimed in claim 1, wherein the second spring element is an elastomeric part.

6. Guide device as claimed in claim 1, wherein the second spring element is a leaf spring.

7. Guide device as claimed in claim 6, wherein the leaf spring is attached to the second support site by means of opposite ends of the leaf spring which face opposite one another, and wherein an elastic middle part of the leaf spring is connected to a component which bears the slide surface

8. Guide device as claimed in claim 1, wherein the first spring element and the second spring element are material sections of a single elastomeric part.

9. Guide device as claimed in claim 1, wherein the guide unit is movable a roof-mounted guide rail.

* * * * *